(12) United States Patent
Troup

(10) Patent No.: US 8,977,739 B2
(45) Date of Patent: Mar. 10, 2015

(54) CONFIGURABLE FRAME WORK FOR TESTING AND ANALYSIS OF CLIENT-SIDE WEB BROWSER PAGE PERFORMANCE

(75) Inventor: James Troup, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 227 days.

(21) Appl. No.: 13/100,218

(22) Filed: May 3, 2011

(65) Prior Publication Data
US 2011/0270975 A1 Nov. 3, 2011

Related U.S. Application Data

(60) Provisional application No. 61/330,838, filed on May 3, 2010.

(51) Int. Cl.
*G06F 15/173* (2006.01)
*G06F 11/22* (2006.01)
*G06F 11/34* (2006.01)

(52) U.S. Cl.
CPC ........ *G06F 11/2294* (2013.01); *G06F 11/3495* (2013.01); *G06F 11/3414* (2013.01); *G06F 2201/81* (2013.01); *G06F 2201/875* (2013.01)
USPC ...................................................... 709/224

(58) Field of Classification Search
CPC ..... H04L 67/02; H04L 67/1008; H04L 43/08; H04L 43/0852; H04L 43/16
USPC .......... 709/223, 227, 224, 220, 203; 707/100, 707/959; 726/22; 705/14; 370/310, 252; 715/230
See application file for complete search history.

(56) References Cited

U.S. PATENT DOCUMENTS 5,072,370 A 12/1991 Durdik
5,577,188 A 11/1996 Zhu
(Continued)

FOREIGN PATENT DOCUMENTS

WO 2004059420 7/2004

OTHER PUBLICATIONS (Steven Sanderson's blog, First steps with Lightweight Test Automation Framework, Mar. 27, 2009, retrieved from http://blog.stevensanderson.com/2009/03/27/first-steps-with-lightweight-test-automation-framework/, pp. 1-9).*

(Continued)

*Primary Examiner* — Dustin Nguyen
*Assistant Examiner* — Michael A Keller
(74) *Attorney, Agent, or Firm* — Ingrassia Fisher & Lorenz, P.C.

(57) ABSTRACT

The present invention features methods, computer program products and apparatuses for measuring client-side computer system performance that features identifying one of a plurality of uniform resource locator addresses contained on a server computing system, with each of the uniform resource locator addresses being associated with computing resources. The computing the computing resources associated with any one of the plurality of uniform resource locator addresses being different from the computer resource corresponding to the remaining uniform resource locator addresses. The computing resources are accessible through a web-browser that accesses the same the computing resources associated with the one of the plurality of uniform resource locator addresses. Measured are metrics of the interactions between the web-browser and the computing resources associated with the one of the plurality of uniform resource locator addresses. It is determined whether the metrics satisfy pre-determined operational requirements.

17 Claims, 5 Drawing Sheets

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |
| 5,974,453 A * | 10/1999 | Andersen et al. .............. 709/220 |
| 5,987,471 A | 11/1999 | Bodine et al. |
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,256,671 B1 * | 7/2001 | Strentzsch et al. ............ 709/227 |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,998 B1 * | 6/2002 | Bryant et al. .................. 709/224 |
| 6,425,003 B1 * | 7/2002 | Herzog et al. ................. 709/223 |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Statukis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,072,935 B2 * | 7/2006 | Kehoe et al. .................. 709/203 |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,698,160 B2 | 4/2010 | Beaven et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,849,401 B2 | 12/2010 | Elsa et al. |
| 8,069,194 B1 * | 11/2011 | Manber et al. ................ 715/230 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0023440 A1 | 9/2001 | Franklin et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143931 A1 * | 10/2002 | Smith et al. ................... 709/224 |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |

(56) References Cited

U.S. PATENT DOCUMENTS

| | | |
|---|---|---|
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010578 A1* | 1/2005 | Doshi ................. 707/100 |
| 2005/0050555 A1 | 3/2005 | Exley et al. |
| 2005/0091098 A1 | 4/2005 | Brodersen et al. |
| 2005/0216342 A1* | 9/2005 | Ashbaugh ............ 705/14 |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2006/0248372 A1* | 11/2006 | Aggarwal et al. .......... 714/4 |
| 2007/0078705 A1 | 4/2007 | Abels et al. |
| 2007/0088741 A1 | 4/2007 | Brooks et al. |
| 2007/0115845 A1* | 5/2007 | Hochwarth et al. ........ 370/252 |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150546 A1 | 6/2007 | Karakashian et al. |
| 2007/0226640 A1 | 9/2007 | Holbrook et al. |
| 2007/0254635 A1* | 11/2007 | Montelius ................. 455/414.1 |
| 2008/0010243 A1 | 1/2008 | Weissman et al. |
| 2008/0082540 A1 | 4/2008 | Weissman et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman et al. |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0114875 A1* | 5/2008 | Anastas et al. ................ 709/224 |
| 2008/0127092 A1 | 5/2008 | Tomar |
| 2008/0162544 A1 | 7/2008 | Weissman et al. |
| 2008/0201701 A1 | 8/2008 | Hofhansel et al. |
| 2008/0215560 A1 | 9/2008 | Bell et al. |
| 2008/0225760 A1* | 9/2008 | Iyer et al. ..................... 370/310 |
| 2008/0270354 A1 | 10/2008 | Weissman et al. |
| 2008/0270987 A1 | 10/2008 | Weissman et al. |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1 | 2/2009 | Weissman et al. |
| 2009/0049288 A1 | 2/2009 | Weissman et al. |
| 2009/0193521 A1* | 7/2009 | Matsushima et al. ........... 726/22 |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0287791 A1 | 11/2009 | Mackey |
| 2009/0319529 A1 | 12/2009 | Bartlett et al. |
| 2010/0020715 A1* | 1/2010 | Monaco et al. ............... 370/252 |
| 2010/0191719 A1 | 7/2010 | Weissman et al. |
| 2010/0205216 A1 | 8/2010 | Durdik |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |
| 2011/0162025 A1* | 6/2011 | Kellerman et al. ........... 725/116 |

OTHER PUBLICATIONS

[Online]; [published on Oct. 17, 2008]; [retrieved on Feb. 26, 2010]; retrieved from http://en.wikipedia.org/wiki/Push_technology.

[Online]; [published on Oct. 16, 2008]; [retrieved on Feb. 26, 2010]; retrieved from http://en.wikipedia.org/wiki/Customer_Relationship_Management.

[Online]; [published on Apr. 22, 2008]; [retrieved on Feb. 26, 2010]; retrieved from http://en.wikipedia.org/wiki/Flat_file_database.

[Online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Pin, Olivier, U.S. Appl. No. 12/895,833, filed Sep. 30, 2010.

First named inventor: Tanaka, Jay, U.S. Appl. No. 12/831,196, filed Jul. 6, 2010.

First named inventor: Press, William A., U.S. Appl. No. 12/850,502, filed Aug. 4, 2010.

First named inventor: Tanaka, Jay, U.S. Appl. No. 12/831,209, filed Jul. 6, 2010.

First named inventor: Williams, Alexis, U.S. Appl. No. 13/028,236, filed Feb. 16, 2011.

First named inventor: Varadharajan, Arunkumaran, U.S. Appl. No. 12/909,820, filed Oct. 21, 2010.

First named inventor: Le Stum, Guillaume, U.S. Appl. No. 13/093,128, filed Apr. 25, 2011.

* cited by examiner

CONFIGURABLE FRAME WORK FOR TESTING AND ANALYSIS OF CLIENT-SIDE WEB BROWSER PAGE PERFORMANCE

CROSS REFERENCE TO RELATED APPLICATIONS

The present application claims priority to U.S. provisional patent application No. 61/330,838 filed May 3, 2010, entitled CONFIGURABLE FRAME WORK FOR TESTING AND ANALYSIS OF CLIENT-SIDE WEB BROWSER PAGE PERFORMANCE and identifying James Troup as inventor. This aforementioned patent application is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web-based applications typically use a web browser to support execution. These web-based applications are required to be tested against their specified functionalities in order to verify that execution will proceed as intended. For large web-based applications that have many lines of code, automated testing is preferable, because automated testing saves substantial labor as compared to manual testing.

One example of an automated testing system is available under the trade name Selenium. Selenium is a portable software testing framework for web applications that provides a record/playback tool for authoring tests without learning a test scripting language. Selenium provides a test domain specific language (DSL) to write tests in a number of popular programming languages, including various versions of C, Java, Ruby, Groovy, Python, PHP, and Perl. Test playback is possible in most modern web browsers. Selenium deploys on Windows, Linux, and Macintosh platforms. Selenium is open source software released under the Apache 2.0 license and can be downloaded and used without charge.

Another tool used in conjunction with automated testing systems, such as Selenium is known as Jiffy-web, or Jiffy. Jiffy is advertised as a web page instrumentation and measurement suite that was first released in June of 2008. Combined these tools facilitate the testing of computer applications in an efficient manner. However, these tools fail to demonstrate the manner by which to implement the same for testing web-based computer network performance.

A need exists, therefore, to provide testing techniques for web-based computer network performance.

BRIEF SUMMARY

The present invention features methods, computer program products and apparatuses for measuring client-side computer system performance that features identifying one of a plurality of uniform resource locator addresses contained on a server computing system, with each of the uniform resource locator addresses being associated with computing resources. The computing resources associated with any one of the plurality of uniform resource locator addresses are different from the computer resource corresponding to the remaining uniform resource locator addresses. The computing resources are accessible through a web-browser that accesses the same computing resources associated with the one of the plurality of uniform resource locator addresses. Measured are metrics of the interactions between the web-browser and the computing resources associated with one of the plurality of uniform resource locator addresses. It is determined whether the metrics satisfy pre-determined operational requirements. These and other embodiments are discussed more fully below.

DETAILED DESCRIPTION

Figure 1:
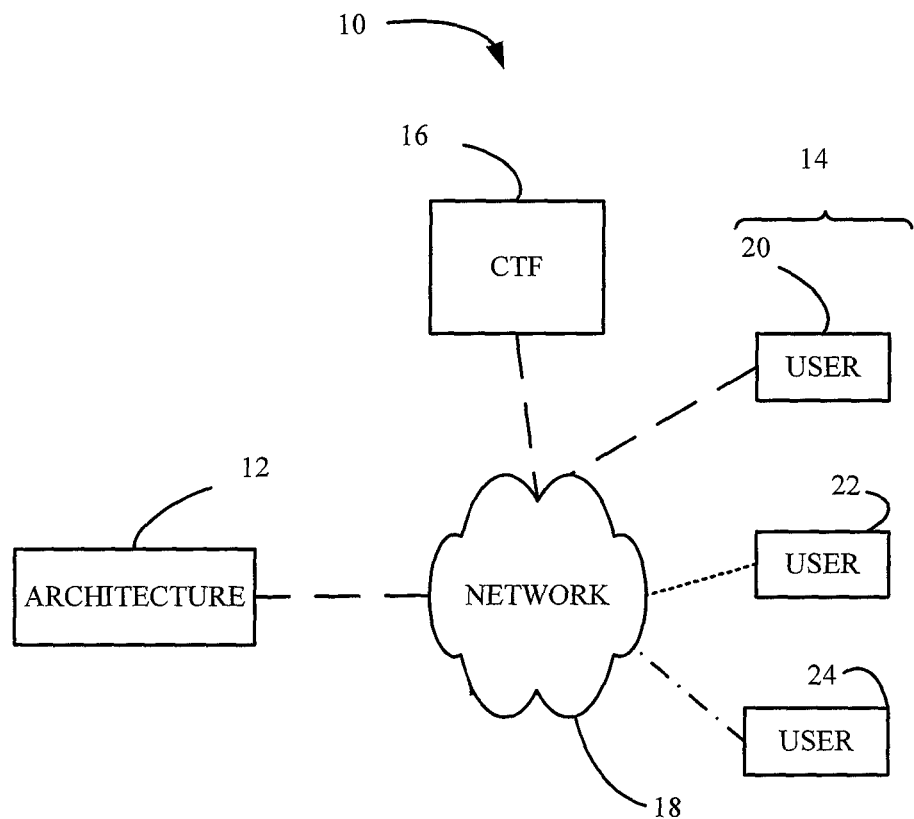
FIG. 1 is a simplified plan view of a computer network in which the current invention is practiced.

Referring to FIG. 1, a computer network 10 includes a multi-tenant database architecture 12 in data communication with client side facilities 14 and a configurable test framework (CTF) 16. Components of computer network 10 may be in data communication over any type of known data communication network 18 or combination of networks of devices that communicate with one another. Data communication network 18 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet", it will be used in many of the examples herein. However, it should be understood that the networks that the present invention might use are not so limited, although TCP/IP is a frequently implemented protocol. As a result the components of network 10 may be co-located in a common geographic area and/or building or spread across a diverse area of the globe, e.g., on several different continents. Typically, client side facilities 14 and CTF 16 are in data communication with architecture 12 over the Internet using suitable computer systems. However, in other configurations CTF 16 may be included in architecture 12. Architecture 12 includes a multi-tenant database system (MTS) in which various elements of hardware and software are shared by one or more multiple users 20, 22 and 24 associated with client side facilities 14.

Figure 2:
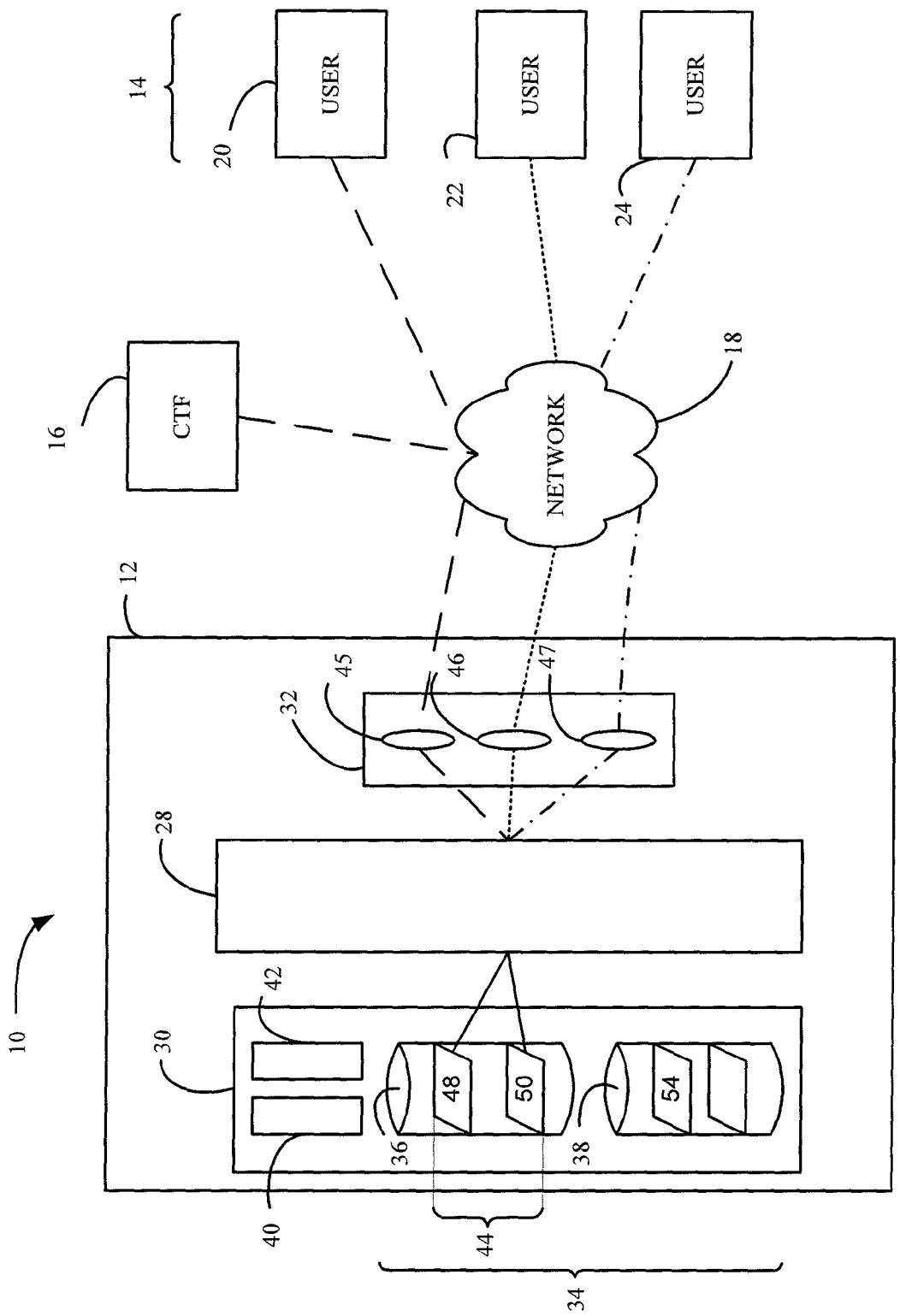
FIG. 2 is a plan view showing a representative architecture in which a multi-tenant database system, shown in FIG. 1, is employed.

A given application server of MTS may simultaneously process requests for a great number of users, and a given database table may store rows for a potentially much greater number of users. To that end, and as shown in FIG. 2, architecture 12 includes a processor sub-system 28, memory space 30, in data communication therewith, and network interface resources 32 in data communication with both memory space 30 and processor sub-system 28. Processor sub-system 28 may be any known processor sub-system in the art, e.g., the CORE DUO® or the CORE 2 DUO® from Intel Corporation of Santa Clara, Calif. Memory space 30 includes drive storage 34, shown as one or more hard drives 36 and 38, as well as data and instruction registers, shown as 40, and volatile and non-volatile memory shown as 42.

Architecture 12 provides access to a database 44 by multiple users 20, 22 and 24 of client side facilities 14 over data communication network 18 using standard computer systems (not shown). To that end, network interface resources 32 include a plurality of virtual portals 45-47. Each virtual portal 45-47 provides an "instance" of a portal user interface coupled to allow access to database 44. Typically, tenants obtain rights to store information, referred to as tenant information 48 and 50, on database 44 and make the same accessible to one or more users 20, 22 and 24 to whom the tenant provides authorization. This is typically achieved by rental agreements between the tenant and an owner/provider of architecture 12. In this manner, architecture 12 provides an on-demand database service to users 20, 22 and 24 that is not necessarily concerned with building and/or maintaining the database system; rather, these functions are addressed between the tenant and the owner/provider.

With architecture 12, multiple users 20, 22 and 24 may access database 44 through a common network address, in this example a universal resource locator (URL). In response, web-pages and other content may be provided to users 20, 22 and 24 over data communication network 18. The resources of database 44 that users 20, 22 and 24 may access can be different, depending on user's 20, 22 and 24 security or permission level and/or tenant association. As a result, data structures included in tenant information 48 and 50 are managed so as to be allocated at the tenant level, while other data structures might be managed at the user level. Because architecture 12 supports multiple tenants including possible competitors, security protocols 52 and other system software 54, stored for example on hard drive 38, maintain applications and applications' use to only those users 20, 22 and 24 with proper access rights. Also, because many tenants may desire access to architecture 12 rather than maintain their own system, redundancy, up-time, and backup are additional functions that may be implemented in architecture 12.

Figure 3:
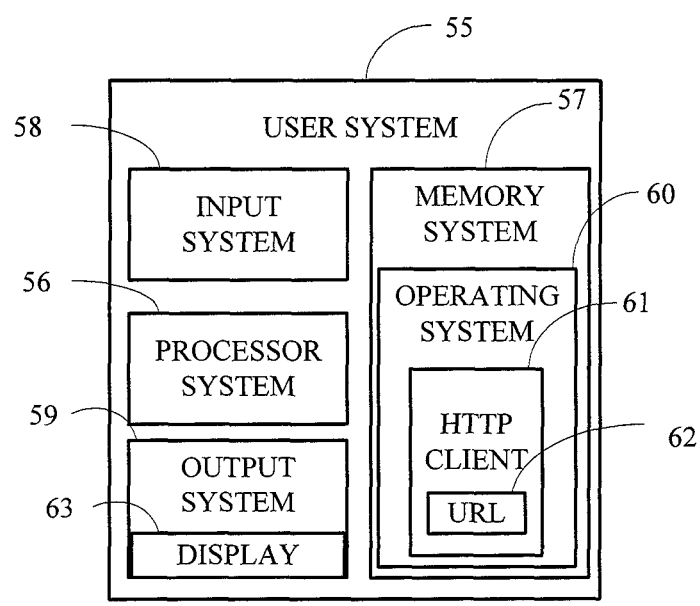
FIG. 3 is a plan view of computer system employed by a user to communicate with the multi-tenant database shown in FIG. 2.

Referring to both FIGS. 2 and 3, to facilitate web-based CRM, a user system 55 employed by one of users 20, 22 and 24 typically communicates with architecture 12 using TCP/IP and, at a higher network level, other common Internet protocols to communicate, such as HTTP, FTP, AFS, WAP, etc. To that end, user system 55 may be any computing device capable of interfacing directly or indirectly to the Internet or other network connection, such as desktop personal computer, workstation, laptop, PDA, cell phone, or any wireless access protocol (WAP) enabled device and the like running an HTTP client. An example of a user system 55 includes a processor system 56, a memory system 57, an input system 58, and output system 59. Processor system 56 may be any combination of one or more processors. Memory system 57 may be any combination of one or more memory devices, volatile, and/or non-volatile memory. A portion of memory system 57 is used to run operating system 60 in which an HTTP client 61 executes. Input system 58 may be any combination of input devices, such as one or more keyboards, mice, trackballs, scanners, cameras, and/or interfaces to networks. Output system 59 may be any combination of output devices, such as one or more displays 63, printers, and/or interfaces to networks. HTTP client 61 allows users 20, 22 and 24 of users systems 55 to access, process and view information, pages and applications available to it from server system architecture 12 over network 18. Examples of HTTP client 61 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 48 and 50 by entering the URL (not shown) into the URL box 62 of HTTP client 61. The URL directs users 20, 22 and 24 to the appropriate virtual portal for to determine authorization and permission level to access the requisite tenant information 48 and 50. In one embodiment, users 20, 22 and 24 gain access to web pages stored on database 44. The web pages are rendered in HTTP client 61.

Referring to both FIGS. 2 and 3, an important aspect with respect to providing desired user experience is to avoid the functional latency of the interaction of users 20, 22 and 24 with respect to database 44. One manner in which functional latency may detract from user experience is by HTTP client 61 requiring too great of time to parse and render a web pages. This may occur in response to changes implemented to architecture 12 and/or user system 55. One advantage for a tenant utilizing architecture 12 is that functional and/or computational improvements to the same and/or user system 55 may be provided with minimal and/or no deleterious effects to a user's experience of database 44.

Figure 4:
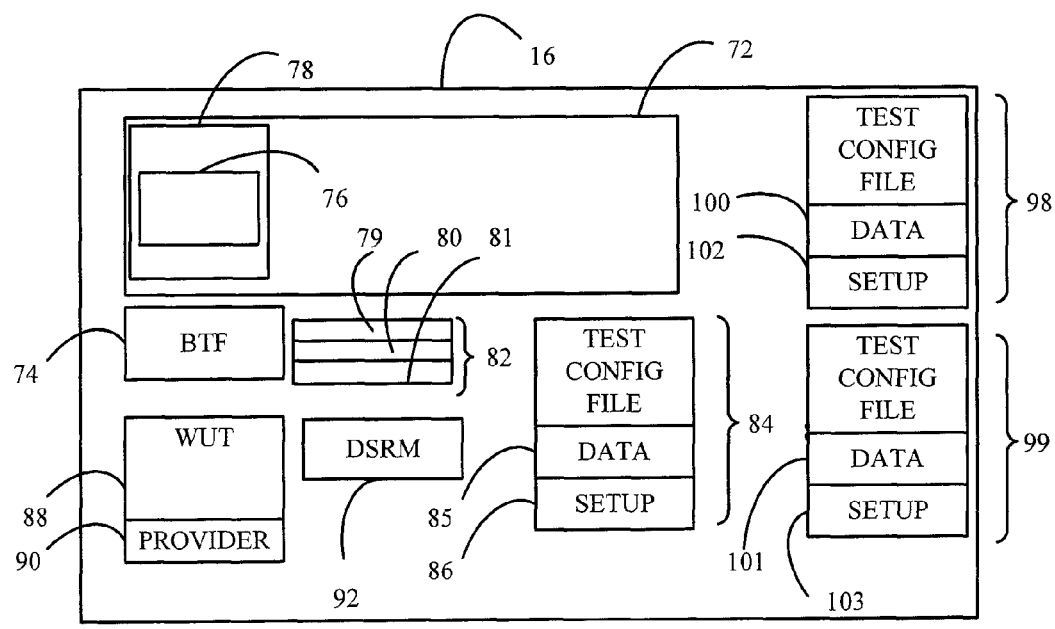
FIG. 4 is a detailed view of a configuration testing framework shown in FIG. 1.

Referring to FIGS. 2, 3 and 4, to minimize deleterious effects on a user's experience when implementing changes to either architecture 12 and/or user system 55, testing of the proposed changes is undertaken to determine whether the use experience is degraded as a result of the changes. The tests may be implemented on CTF 16. CTF 16 may include hundreds of computer systems (not shown), colloquially referred to as a server farm, upon which an emulation 72 of network 10 is implemented. Emulation 72 mimics the operational interaction and operational characteristics of client side facilities 14 and architecture 12. It is desired to minimize the number of man-hours required to perform the testing. Given the complexity of architecture 12 and the number of users 20, 22 and 24 that may access the same at any given time automated testing is employed. To that end, an open source browser testing framework (BTF) 74 is employed in CTF 16. One example of BTF 74 is sold under the trade name Selenium RC that is available from http://seleniumhq.org/. An instance 76 of BTF 74 is run in a browser 78 of emulation 72. Emulation 72 is established to mimic operations of user system 55 of one of users 20, 22 and 24. As a result, browser 78 is an emulation of HTTP client 61. Browser 78 executes a sequence of test methods 79, 80 and 81, referred to as a test group 82, on a web-based application under test, and referred to as a test configuration file 84, which is run on emulation 72. Specifically, BTF 74 opens web browser 78 and provides methods 79-81 that interact with browser 78 programmatically, i.e., without the need for human intervention once BTF 74 has launched. BTF 74 navigates to a specific URL address and queries the content of a web page under test 88 (WUT).

Test configuration file 84 includes test configuration data 85 and environmental setup mechanism 86. Test configuration data 85 configures individual tests and includes metadata to facilitate execution of the test. Examples of the metadata that may be included in test configuration data 85 includes a universal resource locator (URL) address of WUT 88. This may be an explicit/static URL address or it may include information that a web application (not shown) may employ to derive the URL address at which the WUT 88 is located. Additionally, metadata may include environmental configuration information so that emulation 72 accurately mimics the interactions of architecture 12 with client side facilities 14. Metadata is also included identifying metrics that must be satisfied by the test, e.g., a failure threshold for events that occur on client-side facilities 14. One example of a failure threshold would be web-page loading time, i.e., whether WUT 88 is rendered upon browser 78 in a predetermined amount of time. The time is typically measured in milliseconds. Were the interactions of client side facilities 14 and architecture 12 to occur outside of the allotted time then the test would be reported as a failure. Other metadata that may be included in configurable test data 85 identifies the owner of the test, an e-mail or other electronic address to which a communication is transmitted indicating the results of the test, e.g., whether a failure had occurred; test case tags; logical grouping of test cases or any other associated metadata specific to a given test. Finally, the metadata in test configuration data 85 is provided to communicate to environmental setup mechanism 86. An example test configuration data 85 is as follows:

```
<TestCases xmlns:xsi="http://www.w3.org/2001/XMLSchema-instance"
xsi:noNamespaceSchemaLocation="TestCases.xsd">
    <TestCase name="testCase1" owner="jtroup" urlType="staticUrl"
url="/home.jsp" setupSteps="enableHomePage">
        <MeasuredEvent name="pageLoadTime"
        failureThreshold="200"/>
    </TestCase>
    <TestCase name="testCase2" owner="jtroup" urlType="derived"
DAO="CustomerObject" view="edit"
setupSteps="enableCustomerObjects">
        <MeasuredEvent name="pageLoadTime"
        failureThreshold="200"/>
    </TestCase>
</TestCases>
```

The test configuration data 85 recited above includes two test cases: testCase1 and testCase2. Typically, test configuration data 85 is stored on CTF 16 in extended markup language (XML) The first test case, testCase1, is directed to a static URL address for BTF 64. The second test case, testCase2 provides metadata that will be used by environment setup mechanism 86 to create a new CustomerObject and construct the URL address for that object's "edit" view. Both testCase1 and testCase2 pass named steps to environmental setup mechanism 86, "enableHomePage" and "enableCustomerObjects", respectively. The metrics established by test configuration data 65 that WUT 88 must satisfy is that WUT 88 must be rendered by browser 78 in no greater than 200 ms.

Environmental setup mechanism 86 performs any desired web application pre-test setup of emulation 72. This may include configuration to accurately emulate a desired web server configuration; database population; and web application metadata configuration that may affect the generated content of the WUT 88. Environmental setup mechanism 86 essentially allocates the computer resources of CTF 16 that are accessible by browser 78 by virtue of it establishing emulation 72. As a result, the environmental configuration metadata included in test configuration data 85 determines which steps are performed by environmental setup mechanism 86. An example of environmental setup mechanism 86 is as follows:

```
<SetupSteps xmlns:xsi="http://www.w3.org/2001/XMLSchema-instance"
xsi:noNamespaceSchemaLocation="SetupSteps.xsd">
    <SetupStep name="enableHomePage">
        <JavaCall method="PageUtilities.enableHomePage"/>
    </SetupStep>
    <SetupStep name="enableCustomerObjects">
        <JavaCall
        method="ObjectPermissions.enableCustomerObjects"/>
    </SetupStep>
</SetupSteps>
```

As with the test configuration data 85, the environmental setup mechanism 66 is written in XML. This environmental setup mechanism 66 calls architecture 12 logic in Java. The Java code will perform to enable the specified features.

BTF 74 is also written in Java code to communicate with Selenium to opening the WUT in browser 78 determine the time to render WUT. An example of BTF Java code is as follows:

```
public int getPageLoadTime( ) {
    String url = getUrlToTest( );
    open(url);
    return getLoadTimeFromClient( );
}
```

In short, the test case configuration data 85 provides a data access object (DAO) name and the name of a view for that object, e.g., "detail view", "edit view", etc. to environmental setup mechanism 86. Environmental setup mechanism 86 operates on the DAO to mimic, or create a mock instance, of the specified DAO and constructs a URL address to the DAO at the specified view. BTF 74 navigates to the constructed URL address gathers performance metrics on the generated page that represents a view of the DAO.

Included in WUT 88 is a client-side data provider 90 to measure the performance metrics. Client-side data provider 90 analyzes the actions of web browser 78 and generates reports concerning the same. One metric of interest is load time of WUT 88, representing the time taken for browser 78 to parse and render an HTML, used to define WUT 88, into a usable web page by browser 78. One manner in which to gather performance timings would involve comparing JavaScript timestamps at various points within client-side code. To that end, client side data provider 90 uses JavaScript to gather page load time and stores it in a table of measurement that may be retrieved by BTF 74. An example of client side data provider is Jiffy-web, or Jiffy. Jiffy is advertised as a web page instrumentation and measurement suite that was first released in June of 2008. Support for Jiffy is available from http://code.google.com/p/jiffy-web/wiki/Jiffy_js.

Figure 5:
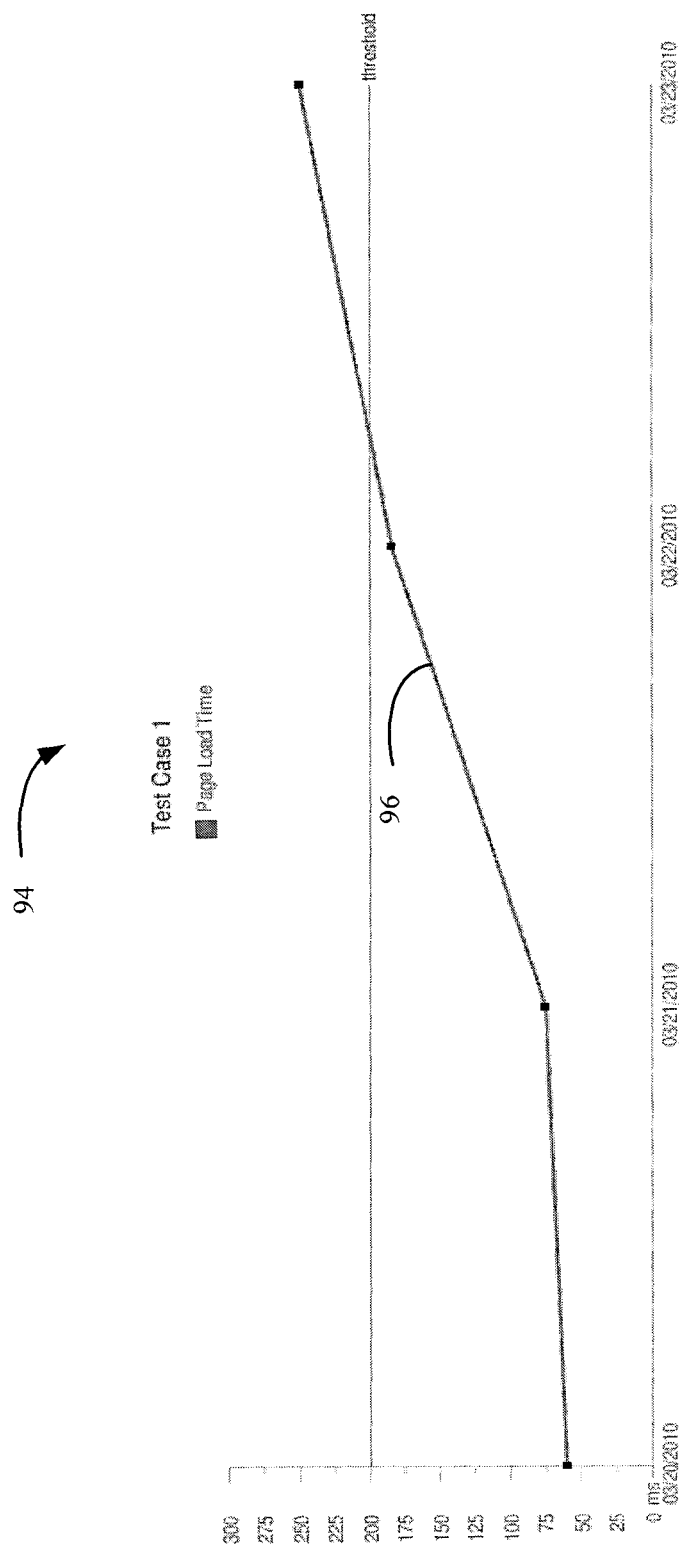
FIG. 5 is a graphical display showing web page load time trends employing the current invention.

Also included in CTF 16 is a data storage and retrieval mechanism (DSRM) 92. DSRM 92 provides a persistent storage place for test case measurements and metadata, e.g., the time a particular test was performed, the version of browser 78, system hardware on which the test was run and the like. DSRM 70 may be stored as a plain text file on CTF 16 or architecture 12, or as any number of persistent databases like MySQL. DSRM 92 may also provide trending data in virtually any format, such as graph 72, shown in FIG. 5. As shown, graph 94 includes an x-axis representing the times individual test have been performed, and a y-axis representing event duration. The slope of line 96 illustrates an increase in page load time occurring over time. Typically the DSRM 92 is implemented in Javascript, as example of which used to generate graph 94 is as follows:

```
<TestCaseResults
xmlns:xsi="http://www.w3.org/2001/XMLSchema-instance"
xsi:noNamespaceSchemaLocation="TestCaseResults.xsd">
    <TestCaseResult testCaseName="testCase1" dateRun="03/20/2010"
failed="false">
        <MeasuredEvent name="pageLoadTime" value="60"
failureThreshold="200"/>
    </TestCaseResult>
    <TestCaseResult testCaseName="testCase1" dateRun="03/21/2010"
failed="false">
```

```
        <MeasuredEvent name="pageLoadTime" value="75"
failureThreshold="200"/>
    </TestCaseResult>
    <TestCaseResult testCaseName="testCase1" dateRun="03/22/2010"
failed="false">
        <MeasuredEvent name="pageLoadTime" value="184"
failureThreshold="200"/>
    </TestCaseResult>
    <TestCaseResult testCaseName="testCase1" dateRun="03/23/2010"
failed="true">
        <MeasuredEvent name="pageLoadTime" value="250"
failureThreshold="200"/>
    </TestCaseResult>
</TestCaseResults>
```

Referring again to FIG. 4 although the CTF 16 has been described with respect to a single data configuration file 84, in practice a plurality of data configuration files would be included, three of which are shown as 84, 98 and 99. Each of the data configuration files 84, 98 and 99 would being associated with a uniform resource locator address that is different from the uniform resource locator addresses associated with the remaining data configuration files 84, 98 and 99. It should be understood that each data configuration files 84, 98 and 99 includes corresponding test configuration data, 85, 100 and 101, respectively and environmental setup mechanism 86, 102 and 103, respectively. These will allocate different resources of CTF 16 to be accessible by a browser 78, because each generates a different emulation 72. Thus, computing resources of CTF 16 allocated to browser 78 is dependent upon the uniform resource locator address to which browser 78 is directed so that different emulations 72 may occur. Thus, the computing resources associated with any one of the plurality of uniform resource locator addresses is different from the computer resource corresponding to the remaining uniform resource locator addresses of the plurality of uniform resource locators defined by data configuration files 84, 98 and 99.

The Computer code for operating and configuring network 10 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method of measuring client-side computer system performance, said method comprising:
   identifying, by a configurable test framework in communication with a database architecture and the client-side computer system of a computer network, a test configuration file, the test configuration file including environmental configuration information and test configuration data, the test configuration data including a name for a data access object and a view for a data access object and the test configuration data identifying a first uniform resource locator address of a plurality of uniform resource locator addresses contained on a server computing system;
   creating, by the configurable test framework, an instance of the data access object using the test configuration data;
   constructing, by the configurable test framework, the first uniform resource locator address for viewing the instance of the object at the view specified by the test configuration data;
   establishing, by the configurable test framework, an emulation of operation of the computer network including the client-side computer system and the database architecture based on the environmental configuration information, the emulation comprising computer resources associated with the first uniform resource locator address, the computing resources being allocated based on the environmental configuration information, with the computing resources associated with the first uniform resource locator address being different from computer resources corresponding to the remaining uniform resource locator addresses;
   accessing, with a web-browser of the emulation, the computing resources associated with the first uniform resource locator address constructed for viewing the instance of the object at the specified view;
   measuring operational characteristics between said web-browser and the computing resources associated with the first uniform resource locator address, wherein the operational characteristics include a load time associated with the computing resources; and
   determining, utilizing instructions executed by the web-browser, whether said operational characteristic satisfy pre-determined operational requirements, defining measured results.

2. The method as recited in claim 1 further including storing said measured results on said server computing system, with the computing resources being stored on said computer system, with said web-browser being run on said server computing system.

3. The method as recited in claim 1 further including ascertain said operational characteristics failed to satisfy said pre-determined operational requirements and transmitting an electronic message to a pre-defined address including information corresponding to said results.

4. The method as recited in claim 1 wherein said computer resources further includes web page content and accessing further includes said web-browser programmatically interacting with said web page content.

5. The method as recited in claim 1 wherein said computer resources further includes web page content and accessing further includes rendering perceivable stimuli in said web browser in response to interacting with said web page content, with measuring further including determining a time for said web browser to render said perceivable stimuli.

6. The method as recited in claim 1, the test configuration data comprising metadata stored on said server computing system, wherein identifying further includes generating, with a web application, the first uniform resource locator address from the metadata.

7. The method of claim 1, wherein the emulation comprises a desired population for a database of the database architecture.

8. The method of claim 1, the database architecture comprising a multi-tenant database system, wherein the emulation comprises a desired configuration for an application server of the multi-tenant database system.

9. The method of claim 1, wherein:
measuring the operational characteristics comprises gathering performance metrics on a generated page that represents the specified view of the object.

10. A computer product of the type comprising a non-transitory computer readable medium that contains a program to measure client-side computer system performance said method comprising:
computer code that identifies a test configuration file, the test configuration file including environmental configuration information and test configuration data, the test configuration data including a name for a data access object and a view for a data access object and the test configuration data identifying a first uniform resource locator address of a plurality of uniform resource locator addresses contained on a server computing system;
computer code that creates an instance of the data access object using the test configuration data; computer code that constructs the first uniform resource locator address for viewing the instance of the object at the view specified by the test configuration data;
computer code that establishes an emulation of operation of a computer network including the client-side computer system and a database architecture based on the environmental configuration information, the emulation comprising computing resources associated with the first uniform resource locator address, the computing resources being allocated based on the environmental configuration information, with the computing resources associated with the first uniform resource locator address being different from computer resources corresponding to the remaining uniform resource locator addresses;
computer code that accesses, with a web-browser of the emulation, the computing resources associated with the first uniform resource locator address constructed for viewing the instance of the object at the specified view;
computer code to measure operational characteristics between said web-browser and the computing resources associated with the first uniform resource locator address, wherein the operational characteristics include a load time associated with the computing resources; and
computer code, executable by the web-browser, to determine whether said operational characteristics satisfy pre-determined operational requirements, defining measured results.

11. The computer product as recited in claim 10 further including computer code to store said measured results on said server computing system, with the computing resources being stored on said computer system, with said web-browser being run on said server computing system.

12. The computer product as recited in claim 10 further including computer code to ascertain that said operational characteristics failed to satisfy said pre-determined operational requirements and transmit an electronic message to a pre-defined address including information corresponding to said results.

13. The computer program product as recited in claim 10 wherein said computer resources further includes web page content and said computer code to access further includes a subroutine to have said web-browser programmatically interact with said web page content.

14. An apparatus to measuring client-side computer system performance, said method comprising:
a processor;
one or more stored sequences of instructions which, when executed by the processor, cause the processor to carry out the steps of:
identifying a test configuration file, the test configuration file including environmental configuration information and test configuration data, the test configuration data including a name for a data access object and a view for a data access object and the test configuration data identifying a first uniform resource locator address of a plurality of uniform resource locator addresses contained on a server computing system;
creating an instance of the data access object using the test configuration data;
constructing the first uniform resource locator address for viewing the instance of the object at the view specified by the test configuration data;
establishing an emulation of operation of the computer network including the client-side computer system and the database architecture based on the environmental configuration information, the emulation comprising computer resources associated with the first uniform resource locator address, the computing resources being allocated based on the environmental configuration information, with the computing resources associated with the first uniform resource locator address being different from computer resources corresponding to the remaining uniform resource locator addresses;
accessing, with a web-browser of the emulation, the computing resources associated with the first uniform resource locator address constructed for viewing the instance of the object at the specified view;
measuring, utilizing instructions executed by the web-browser, operational characteristics between said web-browser and the computing resources associated with the first uniform resource locator address, wherein the operational characteristics include a load time associated with the computing resources; and
determining whether said operational characteristics satisfy pre-determined operational requirements, defining measured results.

15. The apparatus as recited in claim 14 where said sequence of instructions further includes additional instructions, when executed by the processor, cause the processor to carry out a step of storing said measured results on said server computing system, with the computing resources being stored on said computer system.

16. The apparatus as recited in claim 14 where said sequence of instructions further includes additional instruction, when executed by the processor, cause the processor to carry out a step of ascertaining that said operational characteristics failed to satisfy said pre-determined operational requirements and transmitting an electronic message to a pre-defined address including information corresponding to said results.

17. A computer product of the type comprising a non-transitory computer readable medium that contains a program to measure client-side computer system performance by performing the method of claim 1.

* * * * *